(12) United States Patent  (10) Patent No.: US 6,633,694 B2
Tew  (45) Date of Patent: Oct. 14, 2003

(54) MICROMIRROR OPTICAL SWITCH

(75) Inventor: Claude E. Tew, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 120 days.

(21) Appl. No.: 09/966,399

(22) Filed: Sep. 28, 2001

(65) Prior Publication Data

US 2002/0076138 A1 Jun. 20, 2002

Related U.S. Application Data

(60) Provisional application No. 60/236,677, filed on Sep. 29, 2000.

(51) Int. Cl.[7] .............................. G02B 6/26; G02B 6/42
(52) U.S. Cl. ......................................... 385/18; 359/223
(58) Field of Search ............................. 385/17, 18, 15; 359/838, 83.9, 196, 212, 221, 223

(56) References Cited

U.S. PATENT DOCUMENTS

| | | | |
|---|---|---|---|
| 5,061,049 A | 10/1991 | Hornbeck | 359/224 |
| 5,583,688 A | 12/1996 | Hornbeck | 359/291 |
| 6,430,331 B1 * | 8/2002 | Hagelin et al. | 385/17 |
| 6,466,711 B1 * | 10/2002 | Laor et al. | 385/18 |
| 2002/0067880 A1 * | 6/2002 | Huber et al. | 385/17 |
| 2002/0159679 A1 * | 10/2002 | Strasser et al. | 385/16 |
| 2002/0164109 A1 * | 11/2002 | Oikawa et al. | 385/17 |
| 2002/0164113 A1 * | 11/2002 | Rensing et al. | 385/18 |

* cited by examiner

Primary Examiner—Michael C. Zarroli
(74) Attorney, Agent, or Firm—Charles A. Brill; Wade James Brady, III; Frederick J. Telecky, Jr.

(57) ABSTRACT

A family of optical switches. Each switch (400) includes a holder block (402) to hold optical fibers (410, 412) and ferrules (414) in alignment with a micromirror array (406). The holder block 402 has a reflective bottom surface (404). The bottom surface (404) functions as a retro-reflector when the optical switch (400) is assembled. The micromirror array (406) has a substrate on which rows of micromirrors have been fabricated. The ferrules (414) are held at an angle relative to the micromirror array (406). This angle allows the light emitted from the input fiber (410) to traverse the array of micromirrors (406) to the output fiber (412). Light from the input fiber (410) is reflected between a series of mirrors (408) and the retro-reflective surface (404) until reaching the output fiber (412). The rotation of the mirrors determines the path of light across the mirror array (406) and which output fiber (412) the light reaches.

40 Claims, 5 Drawing Sheets

MICROMIRROR OPTICAL SWITCH

CROSS REFERENCE TO RELATED APPLICATIONS

This application claims priority under 35 USC §119(e)(1) of provisional application No. 60/236,677 filed Sep. 29, 2000.

The following patents and/or commonly assigned patent applications are hereby incorporated herein by reference:

| Patent No. | Filing Date | Issue Date | Title |
|---|---|---|---|
| 5,061,049 | Sep. 13, 1990 | Oct. 29, 1991 | Spatial Light Modulator and Method |
| 5,583,688 | Dec. 21, 1993 | Dec. 10, 1996 | Multi-Level Digital Micromirror Device |
| 09/923,911 | Aug. 7, 2001 | | Two Dimensional Blazed MEMs Grating |
| 60/236,533 | Sep. 29, 2000 | | Micromirror Optional Switch |

FIELD OF THE INVENTION

This invention relates to the field of optical communications, more particularly to switches used in fiber-optic networks.

BACKGROUND OF THE INVENTION

Optical networks use modulated light to enable clear, rapid communication between two points. The bandwidth and efficiency provided by optical communication systems is well known. A single fiber is able to carry a great deal of information over a tremendous distance. Practical communication systems utilize large numbers of fibers networked together to form a communication web that provides at least one path between any two points on the network. Configuring the network to connect any two points requires a large number of switches.

One method of coupling optical fibers converts the optical signal carried by the input fiber to electrical signals and uses the electrical signal modulate another light beam that is transmitted along the second fiber. This method is much slower than simply switching the optical beam and may introduce noise into the transmitted optical signal. Purely optical switching, in which the optical beam from a first fiber is coupled directly to a second fiber without significant loss, is much faster and more efficient and is therefore desired.

Several types of optical switches have been developed. Some use mechanical means to physically align the input and output fibers. These mechanical switches typically are slow, large, and very expensive. Micromirror based switches either use analog mirrors, which have difficulty maintaining alignment over long periods of time, or are difficult to arrange in matrix switches larger than 1×2. What is needed is an improved optical switch that is very quick to configure, does not require the light beam to be converted to electricity, and allows connection between an input and a large number of outputs.

SUMMARY OF THE INVENTION

Objects and advantages will be obvious, and will in part appear hereinafter and will be accomplished by the present invention that provides a method and system for switchably coupling optical fiber communications using a micromirror device. One embodiment of the claimed invention provides an optical switch. The optical switch comprises: at least one input fiber, at least one output fiber, a retro-reflective surface, and a mirror array. Each input fiber defining an input optical axis and having an exit end. Each output fiber defining an output optical axis and having an entrance end. The retro-reflective surface being between exit and entrance ends. The mirror array defines an x-y plane substantially parallel to said retro-reflective surface, and is comprised of at least one mirror on each input and output optical axis. The mirrors on the input optical axes are operable to rotate about a single axis parallel to the x-y plane to deflect light from each input fiber to at least one intermediate spot on the retro-reflector. The mirrors on the output optical axes are operable to reflect light from at least one of the intermediate spots of the retro-reflector to an associated output fiber sharing the output axis. Variations of this optical switch include embodiments with focusing elements between at least one fiber and the mirror array, and embodiments using groups of mirrors in place of single mirrors associated with each fiber.

According to another embodiment of the present invention an optical switch is disclosed. The optical switch comprises: at least one input fibers, at least one output fiber, a retro-reflective surface, and a mirror array. Each input fiber defines an input optical axis and has an exit end. Each output fiber defines an output optical axis and has an entrance end. The retro-reflective surface is between the exit and entrance ends of the fibers, and substantially parallel to the mirror array. The mirror array is comprised of at least one mirror on each said input optical axis and said output optical axis and at least one intermediate mirror. The mirrors on the input optical axes are operable to rotate about a single axis parallel to the plane of the mirror array. The mirrors deflect light from each input fiber to at least one intermediate spot on the retro-reflector. The mirrors on the output optical axes are operable to reflect light from at least one of the intermediate spots of the retro-reflector to an associated output fiber sharing the output axis. The intermediate mirrors are operable to rotate about a single axis parallel to said plane of the mirror array to deflect light from at least one intermediate spot to at least one other intermediate spot. Variations of this optical switch include embodiments with focusing elements between at least one fiber and the mirror array, and embodiments using groups of mirrors in place of single mirrors associated with each fiber.

The disclosed invention has the advantage of providing low-cost, manufacturable switches that provide efficient switching of optical signals propagated on optical fibers using readily available single axis torsion mirrors.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new optical switch has been developed that uses a readily obtainable micromirror device to optically couple two or more optical fibers. The new switch has a fast switching time and provides an efficient and cost-effective way to couple two or more optical fibers. The new switch architecture provides an efficient means to construct a crossbar switch or a switch with many inputs or outputs using a single-axis torsion beam type micromirror device.

Figure 1:
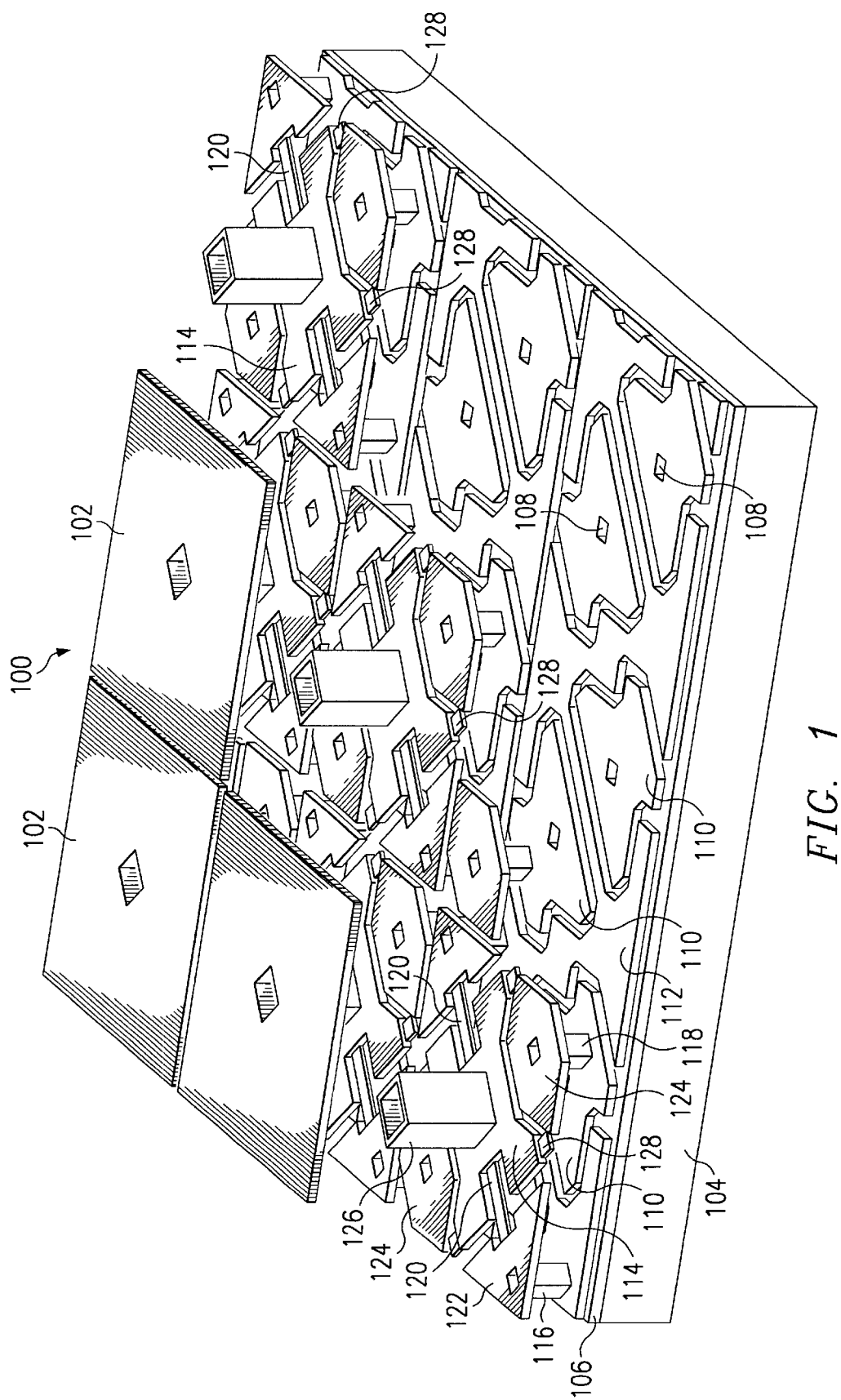
FIG. 1 is a perspective view of a small portion of a micromirror array of the prior art.
Figure 2:
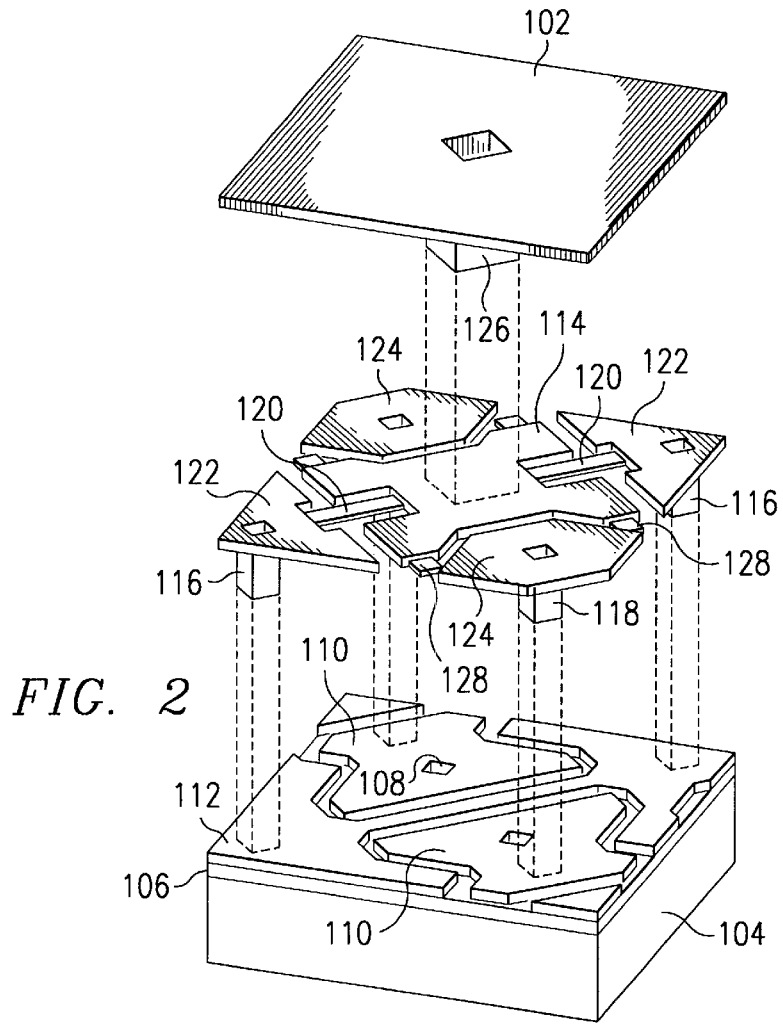
FIG. 2 is an exploded perspective view of a single micromirror element from the micromirror array of FIG. 1.

A typical hidden-hinge micromirror 100 is an orthogonal array of micromirror cells, or elements. This array often includes more than a thousand micromirror rows and columns of micromirrors. FIG. 1 shows a small portion of a micromirror array of the prior art with several mirrors 102 removed to show the underlying mechanical structure of the micromirror array. FIG. 2 is an exploded view of a single micromirror element of the prior art further detailing the relationships between the micromirror structures.

A micromirror is fabricated on a silicon semiconductor substrate 104. Electrical control circuitry typically is fabricated in or on the surface of the semiconductor substrate 104 using standard integrated circuit process flows. This circuitry typically includes, but is not limited to, a memory cell associated with, and typically underlying, each mirror 102 and digital logic circuits to control the transfer of the digital image data to the underlying memory cells. Voltage driver circuits to drive bias and reset signals to the mirror superstructure may also be fabricated on the micromirror substrate, or may be external to the micromirror. Image processing and formatting logic is also formed in the substrate 104 of some designs. For the purposes of this disclosure, addressing circuitry is considered to include any circuitry, including direct voltage connections and shared memory cells, used to control the direction of rotation of a micromirror.

Some micromirror configurations use a split reset configuration which allows several micromirror elements to share one memory cell--thus reducing the number of memory cells necessary to operate a very large array, and making more room available for voltage driver and image processing circuitry on the micromirror integrated circuit. Split reset is enabled by the bistable operation of a micromirror, which allows the contents of the underlying memory to change without affecting the position of the mirror 102 when the mirror has a bias voltage applied.

The silicon substrate 104 and any necessary metal interconnection layers are isolated from the micromirror superstructure by an insulating layer 106 which is typically a deposited silicon dioxide layer on which the micromirror superstructure is formed. Holes, or vias, are opened in the oxide layer to allow electrical connection of the micromirror superstructure with the electronic circuitry formed in the substrate 104.

The first layer of the superstructure is a metalization layer, typically the third metalization layer and therefore often called M3. The first two metalization layers are typically required to interconnect the circuitry fabricated on the substrate. The third metalization layer is deposited on the insulating layer and patterned to form address electrodes 110 and a mirror bias connection 112. Some micromirror designs have landing electrodes that are separate and distinct structures but are electrically connected to the mirror bias connection 112. Landing electrodes limit the rotation of the mirror 102 and prevent the rotated mirror 102 or hinge yoke 114 from touching the address electrodes 110, which have a voltage potential relative to the mirror 102. If the mirror 102 contacts the address electrodes 10, the resulting short circuit could fuse the torsion hinges 116 or weld the mirror 102 to the address electrodes 110, in either case ruining the micromirror.

Since the same voltage is always applied both to the landing electrodes and the mirrors 102, the mirror bias connection and the landing electrodes are preferably combined in a single structure when possible. The landing electrodes are combined with the mirror bias connection 112 by including regions on the mirror bias/reset connection 112, called landing sites, which mechanically limit the rotation of the mirror 102 by contacting either the mirror 102 or the torsion hinge yoke 114. These landing sites are often coated with a material chosen to reduce the tendency of the mirror 102 and torsion hinge yoke 114 to stick to the landing site.

Mirror bias and reset voltages travel to each mirror 102 through a combination of paths using both the mirror bias/reset metalization 112 and the mirrors and torsion beams of adjacent mirror elements. Split reset designs require the array of mirrors to be subdivided into multiple subarrays each having an independent mirror bias connection. The landing electrode/mirror bias 112 configuration shown in FIG. 1 is ideally suited to split reset applications since the micromirror elements are easily segregated into electrically isolated rows or columns simply by isolating the mirror bias/reset layer between the subarrays. The mirror bias/reset layer of FIG. 1 is shown divided into rows of isolated elements.

A first layer of supports, typically called spacervias, is fabricated on the metal layer forming the address electrodes 110 and mirror bias connections 112. These spacervias, which include both hinge support spacervias 116 and upper address electrode spacervias 118, are typically formed by spinning a thin spacer layer over the address electrodes 110 and mirror bias connections 112. This thin spacer layer is typically a 1 $\mu$m thick layer of positive photoresist. After the photoresist layer is deposited, it is exposed, patterned, and deep UV hardened to form holes in which the spacervias will be formed. This spacer layer and a thicker spacer layer used later in the fabrication process are often called sacrificial layers since they are used only as forms during the fabrication process and are removed from the device prior to device operation.

A thin layer of metal is sputtered onto the spacer layer and into the holes. An oxide is then deposited over the thin metal layer and patterned to form an etch mask over the regions that later will form hinges 120. A thicker layer of metal, typically an aluminum alloy, is sputtered over the thin layer and oxide etch masks. Another layer of oxide is deposited and patterned to define the hinge yoke 114, hinge cap 122, and the upper address electrodes 124. After this second oxide layer is patterned, the two metals layers are etched simultaneously and the oxide etch stops removed to leave thick rigid hinge yokes 114, hinge caps 122, and upper address electrodes 124, and thin flexible torsion beams 120.

A thick spacer layer is then deposited over the thick metal layer and patterned to define holes in which mirror support spacervias 126 will be formed. The thick spacer layer is typically a 2 μm thick layer of positive photoresist. A layer of mirror metal, typically an aluminum alloy, is sputtered on the surface of the thick spacer layer and into the holes in the thick spacer layer. This metal layer is then patterned to form the mirrors 102 and both spacer layers are removed using a plasma etch.

Once the two spacer layers have been removed, the mirror is free to rotate about the axis formed by the torsion hinge. Electrostatic attraction between an address electrode 110 and a deflectable rigid member, which in effect form the two plates of an air gap capacitor, is used to rotate the mirror structure. The electrostatic force is a function of both the distance and voltage differential between the address electrode 110 and the deflectable member. In the absence of a voltage differential, the deflectable member is held in a neutral or flat state in which the deflectable member or mirror remains parallel to the plane of the mirror array.

Depending on the design of the micromirror device, the deflectable rigid member is the torsion beam yoke 114, the beam or mirror 102, a beam attached directly to the torsion hinges, or a combination thereof. The upper address electrodes 124 also electrostatically attract the deflectable rigid member.

The force created by the voltage potential is a function of the reciprocal of the distance between the two plates. As the rigid member rotates due to the electrostatic torque, the torsion beam hinges resist deformation with a restoring torque that is an approximately linear function of the angular deflection of the torsion beams. The structure rotates until the restoring torsion beam torque equals the electrostatic torque or until the rotation is mechanically blocked by contact between the rotating structure and a fixed component. As discussed below, most micromirror devices are operated in a digital mode wherein sufficiently large bias voltages are used to ensure full deflection of the micromirror superstructure.

Micromirror devices are generally operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror.

The second mode of operation is a digital mode. When operated digitally, each micromirror is fully deflected in either of the two directions about the torsion beam axis. Digital operation uses a relatively large voltage to ensure the mirror is fully deflected. Since it is advantageous to drive the address electrode using standard logic voltage levels, a bias voltage, typically a negative voltage, is applied to the mirror metal layer to increase the voltage difference between the address electrodes and the mirrors. Use of a sufficiently large mirror bias voltage—a voltage above what is termed the collapse voltage of the device—ensures the mirror will deflect to the closest landing electrodes even in the absence of an address voltage. Therefore, by using a large mirror bias voltage, the address voltages need only be large enough to deflect the mirror slightly.

The micromirror device of FIGS. 1 and 2 is difficult to utilize in a large optical switch. Optical switches are usually designed to use gimbaled micromirror devices—that is, mirrors that rotate about two perpendicular axis. The two axis characteristic of the gimbaled micromirror allows an incident light beam to be deflected in any direction. A single axis micromirror can only deflect the light in two directions, each corresponding to one direction about the axis of rotation. U.S. Patent Application No. 60/236,533 describes an optical switch using a single axis torsional micromirror. Unfortunately, the optical switch described therein is difficult to scale—that is, it is difficult to forming large switches using the methodologies of that application.

Figure 3:
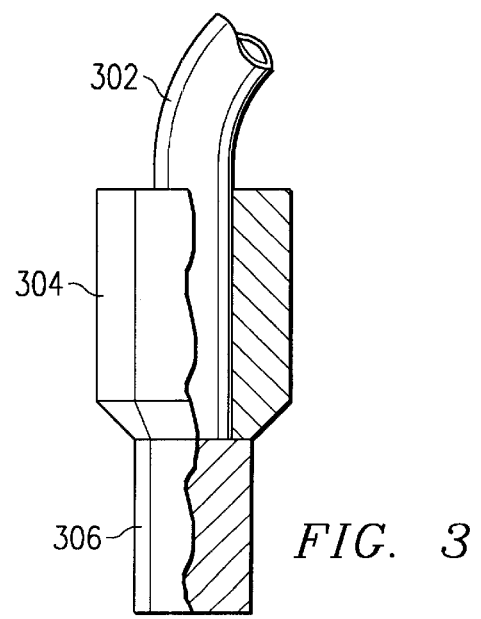
FIG. 3 is a partial cross-section side view of a sheathed optical fiber held in a ferrule with a collimating lens attached.

One way to form large switch arrays, arrays larger than 1×2, is to angle the inputs and outputs to the switch. FIG. 3 is a cross sectional side view of one end of an optical fiber 302 held in a ferrule 304. The ferrule 304 holds a length of the fiber 302 in alignment with a self focusing gradient index (GRIN) lens 306, and simplifies handling of the optical fibers. The GRIN lens collimates the light from the fiber. Collimated light is desired due to the small mirror tilt angle provided by common micromirror devices. Depending on the various optical components used to fabricate the switch, converging (focused) or diverging beams are acceptable.

Figure 4:
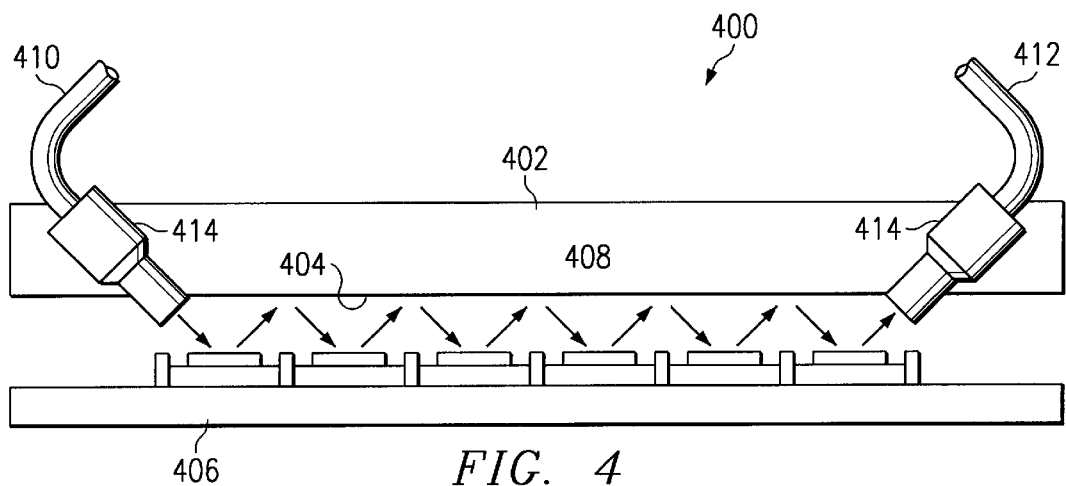
FIG. 4 is a cross-section side view of a holder block designed to hold a number of the ferrules and optical fibers of FIG. 3 over an array of micromirrors.

FIG. 4 is a cross-sectional side view of a holder block 402 designed to align the optical fiber and ferrule of FIG. 3 with a micromirror array. The ferrules are preferably cemented into the holder block, but may be held in the holder block by any of a number of retention mechanisms including clips and molded-in finger that allow insertion of the ferrule into the holder block but prevent or restrict removal of the ferrule from the block 402. Fly-in-place techniques typically are used to precisely align the optical fibers and ferrules with the holder block 402 and mirror array 406. Fly-in-place techniques use receptors to detect optical signals transmitted through the fibers while the relative position of the optical components is adjusted. For example, light from a fiber and reflected by a mirror is detected by a target receptor while the position of the fiber is adjusted. Once the fiber and the mirror are aligned, adhesive holding the ferrule in place is cured to prevent the ferrule from moving.

A novel feature of the holder block 402 of FIG. 4 is the reflective bottom surface 404. The bottom surface functions as a retro-reflector when the optical switch is assembled.

Also shown in FIG. 4 is a micromirror array 406. The micromirror array 406 has a substrate on which rows of micromirrors have been fabricated. Six micromirrors 408 are shown in FIG. 4. Each of the six micromirrors 408 is shown in FIG. 4 as a single micromirror, but it is understood that a group of smaller micromirrors moving in concert is interchangeable with the large individual micromirrors shown. As described in U.S. patent application Ser. No. 09/923,911, the diffractive effects of smaller mirrors affect the use of arrays of small mirrors. When small mirrors, mirrors smaller than the beam cross-section, are used, the mirror rotations angles should be selected to ensure blazed operation of the mirror array.

To avoid the limitations of the prior art—which required jumper fibers or optical couplers to make switches larger than a 1×2 switch—the ferrules in FIG. 4 are held at an angle relative to the micromirror array 406. This angle allows light emitted from the input fiber to traverse the array of micromirrors 406 to the output fiber 412 without the assistance of mirrors rotatable about the perpendicular to the plane of FIG. 4. The arrows in FIG. 4 show the path of the light as it reflects between the mirrors and the retro-reflective surface on the bottom of the block 402.

Figure 5:
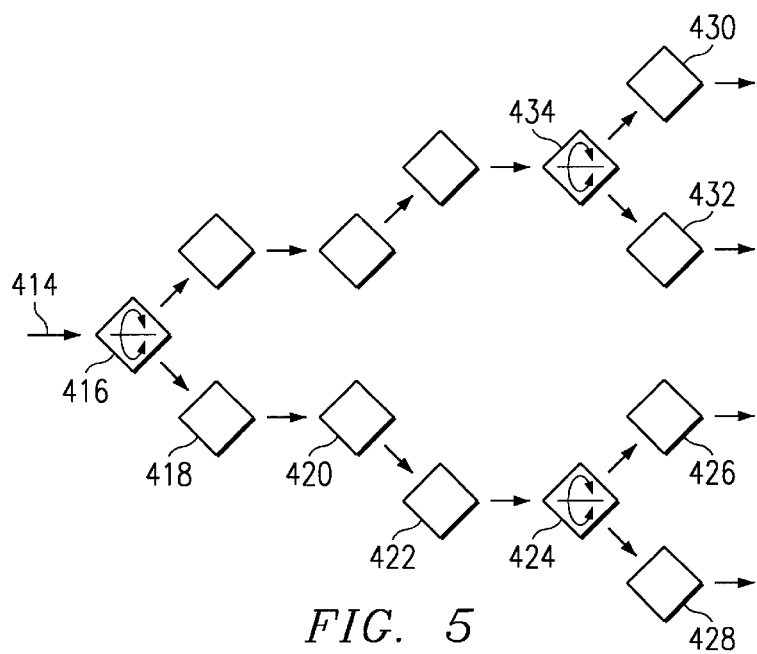
FIG. 5 is a plan view of a micromirror array showing a walk pattern for a 1×4 optical switch using single axis micromirrors and angled inputs and outputs.

FIG. 5 is a plan view of a micromirror array showing the walk pattern for a simple 1×4 optical switch 500. While the switch 500 is described in terms of a single input switch having four outputs, it is understood that the switch, like any other switch described herein, can also be used backwards, in this case forming a 4×1 switch. In FIG. 5, light 414 from an input fiber 410 of FIG. 4 passes through the GRIN lens and strikes micromirror 416. The micro mirror array 416 is shown in FIG. 4 as a side view showing six mirrors. As illustrated in the plan view of FIG. 5, the array is comprised of a minimum of thirteen mirrors, or arrays of small mirrors. The axis of rotation for each of the mirrors in the array is shown in FIG. 5 as being horizontal from corner to corner.

Although all of the mirrors in the array typically rotate, only three need be rotatable for the switch to function. The remainder can be fixed in the rotated position. If all of the mirrors are rotatable, however, the mirrors in unselected branches of the switch can be rotated in the opposite direction to reduce cross-talk between the branches.

Light 414 exiting the input fiber 410 strikes the first mirror 416. If the mirror is deflected toward the bottom of FIG. 5, the light striking mirror 416 is reflected in the direction of rotation. As shown in FIG. 5, that deflection, coupled with the left to right path created by the angled input fiber, transmits light from mirror 416 to mirror 418. Referring to FIG. 4, it is seen that the path from mirror 416 to mirror 418 is not direct. The light reflecting from mirror 416 also is traveling upward from the mirror array 406 and strikes the retro-reflective surface of the holder block 402 before traveling downward to mirror 418. Alternate embodiments use a separate retro-reflective surface 404 instead of the bottom surface of the holder block.

Returning to FIG. 5, mirror 418 is rotated upwards to reflect light along another path reflected by the retro-reflector to mirror 420. Mirrors 416 and 418 act in concert to impart and remove a downward (in FIG. 5) component to the travel of the light beam 414 input by fiber 410. Meanwhile, the rightward travel of the light 414, induced by the angle at which the ferrule is held by the holder block 402, continues. Mirrors 420 and 422 together act to once again offset the beam of light toward the bottom of the page, in the same manner as mirrors 416 and 418. The light from mirror 422 travels to mirror 424 where it is deflected either up toward mirror 426 or down toward mirror 428. Mirrors 426 and 428 cancel the vertical (in FIG. 5) component of the light's travel. After reflecting from either mirror 426 or mirror 428, the light is captured by the output fiber 412, shown in FIG. 4. The top portion of FIG. 5 functions in the same manner.

An alternative switch layout eliminates output mirrors 426, 428, 430, and 432. The ferrules holding the output fibers are then aligned with the angled output beams to receive the light reflected by mirror 424 and 434.

Mirrors 420 and 422 are unnecessary except to separate the four outputs of the switch by a sufficient amount. The switch shown in FIG. 5 is symmetrical, that is each path through the switch traverses the same distance and reflects from the same number of mirrors. If a symmetrical switch is not required, mirrors 420 and 422 are eliminated and mirror 424 is moved to the position of mirror 420, along with mirrors 426 and 428 to shorten the optical path through the bottom half of the switch.

Figure 6:
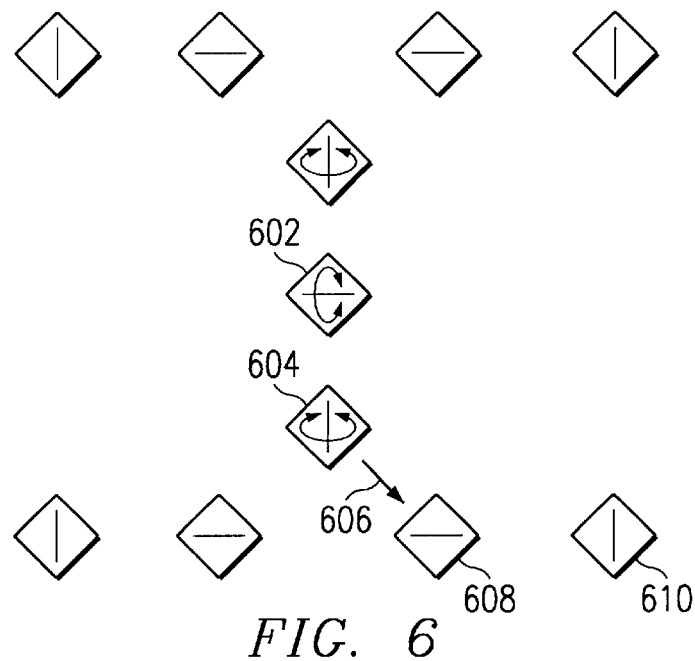
FIG. 6 is a plane view of a symmetric 1×4 optical switch using single axis micromirrors with orthogonal axes.
Figure 7:
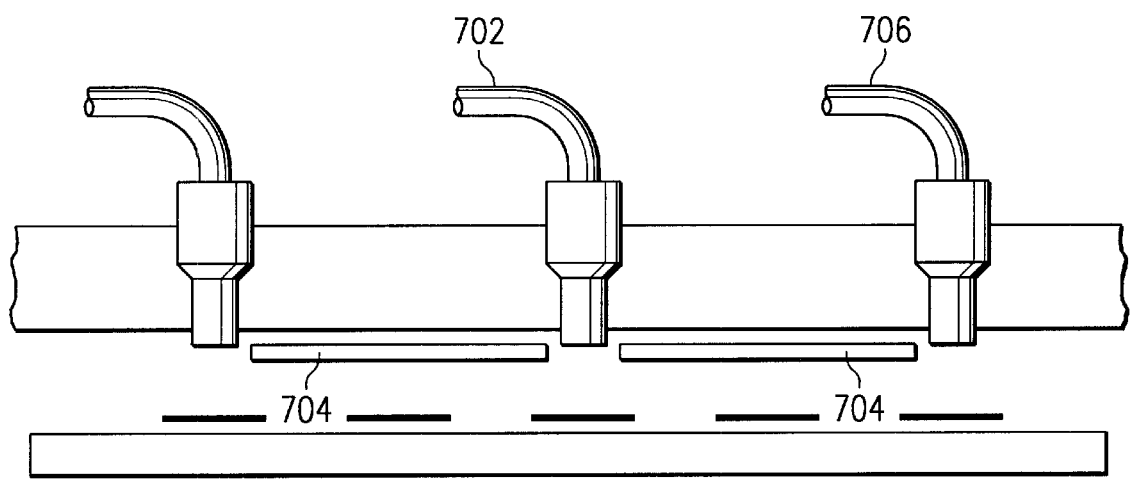
FIG. 7 is a side view of the 1×4 optical switch of FIG. 6 showing the use of a separate retro-reflector.

Instead of the angled inputs and/or angled outputs described above, alternate embodiments of the disclosed invention provide optical switches using single-axis micromirrors by rotating the axis of rotation among the mirrors in an array. FIG. 6 is a plan view of one embodiment of a 1×4 optical switch using micromirrors having orthogonally aligned axes. FIG. 7 is a side view showing the alignment of the input and output fibers with the mirror array. In FIG. 6, light from an input fiber, shown as fiber 702 in FIG. 7, is reflected by a first mirror 602. The axis of mirror 602 is horizontal in FIG. 6. When mirror 602 is rotated toward the bottom of FIG. 6, light striking the mirror is deflected toward mirror 604. As in the previous examples, typically the light traveling from mirror to mirror is reflected by the bottom surface of a holder block between reflections from the mirror array. Alternatively, a separate retro-reflector, 704 of FIG. 7, is used. Separate retro-reflectors are also alternatively used in the prior embodiments.

The axis of mirror 604 is perpendicular to the axis of mirror 602. This allows mirror 604 to deflect light toward either the right or the left of FIG. 6. Assuming mirror 604 deflects the light to the right, the light will be reflected by the retro-reflector and follow light path 606 to mirror 608. The axis of rotation of mirror 608 is horizontal in FIG. 6, such that light from mirror 606 is directed to the right to mirror 610. Mirror 610 is rotated toward mirror 608 and reflects light from mirror 608 straight up to the output fiber, shown as 706 in FIG. 7. Mirrors 608 and 610 need not be selectively deflectable, but rather can be formed to always rotate to and hold in the desired position. For example, mirrors 608 and 610 may be formed with only one address electrode. The address electrode is formed under the side of the mirror that is to be deflected toward the substrate—the top half of mirror 608 and the left half of mirror 610 in FIG. 6. Depending on the voltages supplied to the single address electrode and mirror, the mirror can be forced to deflect every time the device is powered on or a mirror bias voltage is applied.

Figure 8:
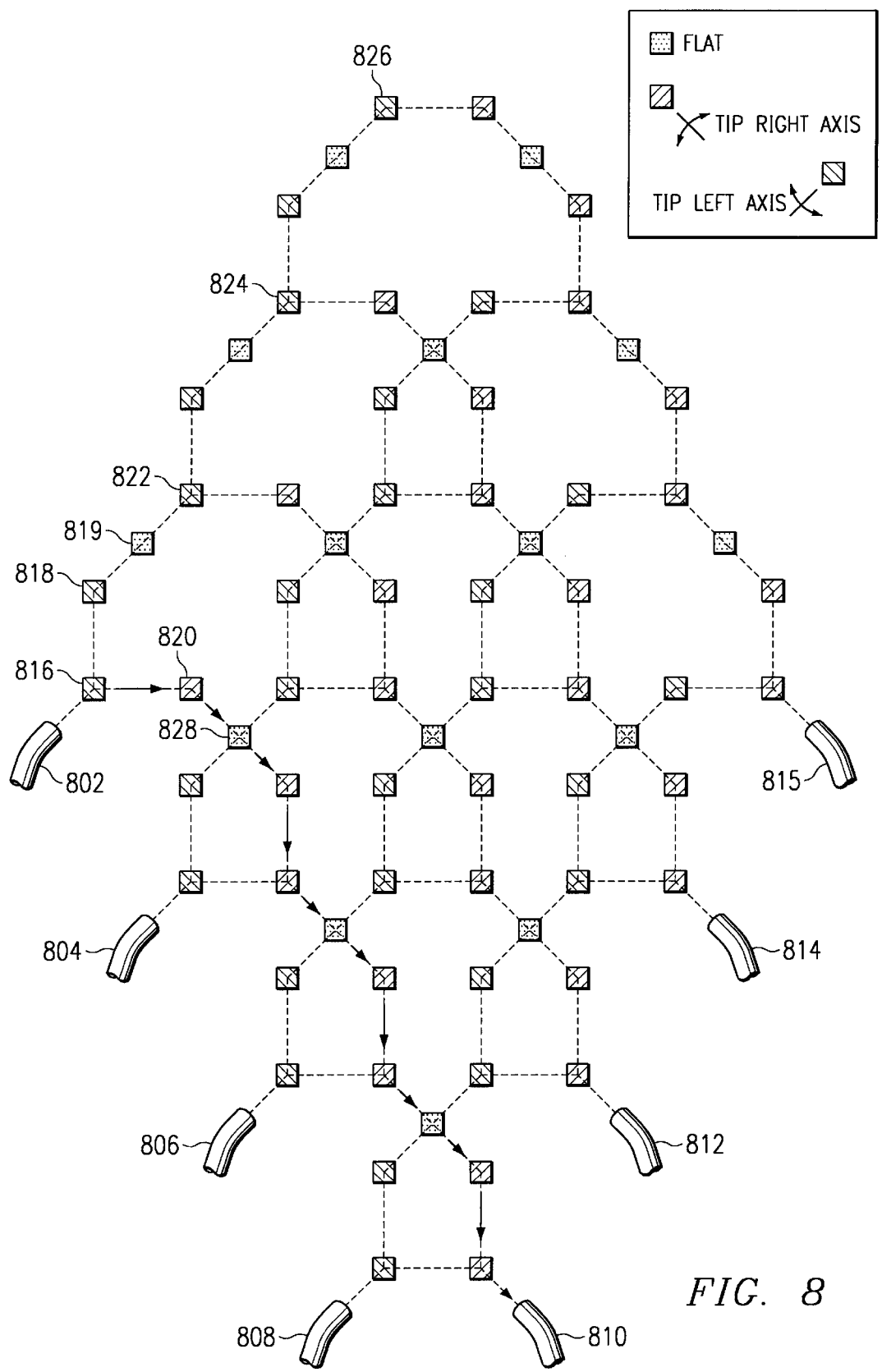
FIG. 8 is a plan view showing a 4×4 scalable optical crossbar switch using dual orthogonal-axis micromirrors.

The angled inputs and orthogonal mirrors described above can be combined to produce large crossbar switches. FIG. 8 shows an array of mirrors 800 organized as a 4×4 matrix. In FIG. 8, there are four inputs on the lower left portion of the array. Each input can use either an angled ferrule, as shown by fiber 802, or a perpendicular fiber in combination with a mirror to angle the light. Likewise, each output can either use a mirror to direct the light to either a perpendicular or angled fiber, ferrule, and collecting optic to collect the light. Although not discussed in the below description of the operation of the switch, or shown in FIG. 8, the light passing from one mirror to the next is reflected by the retro-reflective surface on the bottom of the holder block, or a separate retro-reflector.

The light path from input fiber 802 will be used to explain the operation of the matrix switch of FIG. 8. In FIG. 8, light from fiber 802 strikes mirror 816. The axis of mirror 816 is in the plane of FIG. 8 and runs from the lower left corner of mirror 816 to the upper right corner of mirror 816. Depending on the state of mirror 816, the light is either directed toward the top of the figure to mirror 818, or toward the right of the figure to mirror 820. The shading of each mirror in FIG. 8 illustrates the alignment of the axis of rotation. If mirror 816 is rotated toward the lower right, light from input 802 is directed to mirror 820 and follows the path illustrated by arrows to output 810.

If mirror 816 is rotated to the upper left, light from input fiber 802 will be directed upward in FIG. 8 to mirror 818. From mirror 818, the light will be reflected to mirror 819 and then to mirror 822. If it is desired to direct the light from input fiber 802 to output fiber 812, mirror 822 is rotated to the lower right and the light follows a path to output fiber 812 that is parallel to the earlier described path to output fiber 810. If the light from input fiber 802 is to be directed to output fiber 814, then mirror 822 is rotated to the upper left and the light continues to mirror 824. Mirror 824 is rotated to the lower right to direct the light to output fiber 814. If mirror 824 is rotated to the upper left, the light will continue to mirror 826 and on to output mirror 815. Similar paths exist from each input to each output. The 4×4 matrix of FIG. 8 is scalable to larger matrix switches.

The optical switch of FIG. 8 uses mirrors rotating about a single torsion axis. As shown in FIG. 8, the axes of various mirrors in the switch are orthogonal. Additionally, the optical switch of FIG. 8 includes mirrors that operate in a flat, undeflected, state. Mirror 828 is an example of a flat state mirror. Assuming the mirrors are electrostatically operated as described above, flat state mirrors are mirrors that are not addressed. Since no address voltage is applied to either address electrode, the mirror will not rotate preferentially to either side of the axis. Many bistable addressing schemes, however, bias the mirrors with a bias voltage large enough to force even unaddressed mirrors to rotate to one side or the other. For this reason, the mirror bias voltage applied to the flat state mirrors must be kept below a voltage level that would cause the unaddressed mirrors to rotate.

Preferably, the flat mirrors are fabricated to maintain their flat state. Several means are used to maintain the flat mirrors in the flat state. One method is to connect the mirror to adjacent surfaces or mirrors to prevent the mirrors from rotating. This is easy to implement simply by not removing the mirror metal from between the mirrors. Access holes may be required to facilitate etching away the spacer layers from beneath the mirrors. Another method is to not fabricate the address electrodes and memory cell that are otherwise associated with each mirror. Likewise, the deflectable element is electrically disconnected from the mirror bias voltage source. Eliminating the address voltages and mirror bias voltages prevents the generation of an electrostatic force to rotate the mirror. Yet another alternative is to replace the compliant hinges beneath the mirror with a thick metal connection to support the mirror. Preferably, all of these methods are used both to prevent the generation of electrostatic forces that will deflect the mirror, and to enable the mirror supporting structure to resist any forces that are generated.

Although each of the mirrors described above is described as large enough to individually deflect the beam of light from the input fiber—it should be understood that each of the mirror can also be formed from a set of much smaller mirrors operating in concert to collectively reflect the beam of light. For example, the switches are often formed from an array of mirrors, each array typically being an array of 848 rows and 600 columns. Each mirror is a square 16 $\mu$m on each side and spaced 1 $\mu$m from the surrounding mirrors. Each mirror has an axis that runs diagonally from one corner to the opposite corner of each mirror, parallel to the plane of the array. Each mirror in the array rotates approximately 10° in either direction about the axis.

Because each of the mirrors is so small, the collimated beam of light from each of the input fibers, which is typically 0.80 to 1.2 mm in diameter, falls upon a number of the mirrors. This feature simplifies the alignment between the ferrule holder block and the mirror array. Rather than having to align each fiber precisely with a single mirror, the holder block can be aligned with the entire array of mirrors and the testing process used to determine the relationship between the mirrors and the fibers.

The areas between each mirror are shown as empty spaces in FIGS. 5–10. It should be understood that many embodiments use continuous arrays of mirrors. When mirrors exist between the key mirrors shown in FIGS. 5–8, the additional mirrors can be controlled in any manner desired. Rotating the additional mirrors in the same direction as adjacent key mirrors may increase the signal transmitted by the mirror switch. Rotating the additional mirrors in a direction opposite that of adjacent key mirrors may serve to minimize interference between various paths or with stray light. Alternatively, the regions between the key mirrors contain mirrors held in the flat state.

In addition to aligning each fiber with one or more mirrors in the mirror array, the optical switch must also be aligned to enable the light from a first mirror or group of mirrors to bounce off of the retro-reflector and reach the second mirror or group of mirrors. The height of the retro-reflectors, or holding block if a mirrored retro-reflecting holding block is used, is adjusted to maximize the amount of light following the desired path. If the retro-reflector surface is too close to the mirror array, the light reflected by the retro-reflector surface will not reach the next group of mirrors and the two groups of mirrors will not be efficiently coupled. Likewise, if the retro-reflector surface is too far from the mirror array the reflected light will overshoot the desired group of mirrors.

Although not shown, alternate embodiments of the disclosed optical switch are designed to require additional reflections before reaching the targeted group of mirrors. For example, if the distance between the input and output fibers is large, or if the mirror tilt angle is very low, an additional reflection from the retro-reflector and mirror array is required to displace the beam of light to the output fiber. Because each reflection increases the diffraction and loss, however, the number of reflections is typically held to a minimum.

The optical switches described above enable the use of a digital micromirror—that is, a micromirror that has two stable operating states, rotating fully in either the clockwise or counterclockwise direction. The positions in which the mirror is stable are determined by the physical features of the mirror including the size and shape of the mirror and the height of the mirror above the substrate. Compared to analog mirror control schemes, digital operation provides the advantage of reducing the susceptibility of the mirror array to drift over time and temperature. Nevertheless, analog mirrors, or analog mirror arrays, alternatively are used to form the optical switch.

If an array of mirrors is used to deflect each beam, as opposed to a single mirror, the diffraction of the beam by the array of mirrors affects the operation of the switch. The diffraction effect is controlled by the feature size of the array—that is, but the size of the mirrors and the pitch between the mirrors. The light diffracted by the array will reinforce itself as it reflects back to the holder block, forming a series of points of light at locations representing the diffraction orders. Likewise, the returning light will cancel itself out between these diffraction orders resulting in dark regions between the orders.

These diffraction orders represent the locations at which the light efficiently can be directed by the mirror array. The pitch between the orders is a function of the wavelength of the light and the pitch of the mirror array as well as the height of the holder block or image plane above the mirror array. Selecting the tilt angle of the mirror allows the mirror array to become a blazed grating for a given wavelength, maximizing the coupling of the input light into a given diffraction order. Therefore, the pitch of the array and the tilt angle of the mirrors should be selected to create a blazed diffraction grating for the wavelength of light being switched. Additionally, the f-number of the collecting lens for the two output fibers is selected to allow capture of as much energy from the input beam as practical. Depending on the distances involved, the collecting lens may capture multiple diffraction orders, allowing the diffraction concerns described above to be ignored.

Thus, although there has been disclosed to this point a particular embodiment for a micromirror optical switch and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. An optical switch comprising:
   at least one input fiber, each said input fiber defining an input optical axis and having an exit end;
   at least one output fiber, each said output fiber defining an output optical axis and having an entrance end;
   a retro-reflective surface between said exit and entrance ends; and
   a mirror array, said mirror array defining an x-y plane substantially parallel to said retro-reflective surface, said mirror array comprised of at least one mirror on each said input optical axis and said output optical axis, said mirrors on said input optical axes operable to rotate about a single axis parallel to said x-y plane to deflect light from each input fiber to at least one intermediate spot on said retro-reflector, said mirrors on said output optical axes operable to reflect light from at least one of said intermediate spots of said retro-reflector to an associated output fiber sharing said output axis.

2. The optical switch of claim 1, farther comprising a focusing element between at least one of said fibers and said mirror array.

3. The optical switch of claim 1, said focusing element selected from the group consisting of a collimating lens, a converging lens, a diverging lens, a diffractive focusing means, a refractive focusing means, and a gradient index self focusing lens.

4. The optical switch of claim 1, said mirror array comprised of an array of mirrors, each of said at least one mirror comprising a group of mirrors operating in concert to direct said light from said input fibers to said output fibers.

5. The optical switch of claim 1, further comprising a holding block holding said at least one input fiber at a non-perpendicular angle to said x-y plane.

6. The optical switch of claim 5, said retro-reflective surface comprised of the bottom surface of said holding block.

7. The optical switch of claim 5, said mirror array comprised of an array of mirrors, each of said at least one mirror comprising a group of mirrors operating in concert to direct said light from said input fibers to said output fibers.

8. The optical switch of claim 5, further comprising a focusing element between said input fiber and said mirror array.

9. The optical switch of claim 8, said focusing element selected from the group consisting of a collimating lens, a converging lens, a diverging lens, a diffractive focusing means, a refractive focusing means, and a gradient index self focusing lens.

10. The optical switch of claim 1, further comprising a holding block holding said at least one output fiber at a non-perpendicular angle to said x-y plane.

11. The optical switch of claim 10, said retro-reflective surface comprised of the bottom surface of said holding block.

12. The optical switch of claim 10, said mirror array comprised of an array of mirrors, each of said at least one mirror comprising a group of mirrors operating in concert to direct said light from said input fibers to said output fibers.

13. The optical switch of claim 10, further comprising a focusing element between said input fiber and said mirror array.

14. The optical switch of claim 13, said focusing element selected from the group consisting of a collimating lens, a converging lens, a diverging lens, a diffractive focusing means, a refractive focusing means, and a gradient index self focusing lens.

15. The optical switch of claim 1, at least one of said mirrors in said mirror array having an axis perpendicular to at least one other of said mirrors in said mirror array.

16. The optical switch of claim 15, said mirror array further comprising a holding block holding said at least one of said input and output fibers.

17. The optical switch of claim 16, said retro-reflective surface comprised of the bottom surface of said holding block.

18. The optical switch of claim 14, said mirror array comprised of an array of mirrors, each of said at least one mirror comprising a group of mirrors operating in concert to direct said light from said input fibers to said output fibers.

19. The optical switch of claim 14, further comprising a focusing element between said input fiber and said mirror array.

20. The optical switch of claim 19, said focusing element selected from the group consisting of a collimating lens, a converging lens, a diverging lens, a diffractive focusing means, a refractive focusing means, and a gradient index self focusing lens.

21. An optical switch comprising:
    at least one input fiber, each said input fiber defining an input optical axis and having an exit end;
    at least one output fiber, each said output fiber defining an output optical axis and having an entrance end;
    a retro-reflective surface between said exit and entrance ends; and
    a mirror array, said mirror array defining an x-y plane substantially parallel to said retro-reflective surface, said mirror array comprised of at least one mirror on each said input optical axis and said output optical axis and at least one intermediate mirror, said mirrors on said input optical axes operable to rotate about a single axis parallel to said x-y plane to deflect light from each input fiber to at least one intermediate spot on said retro-reflector, said mirrors on said output optical axes operable to reflect light from at least one of said intermediate spots of said retro-reflector to an associated output fiber sharing said output axis, said intermediate mirrors operable to rotate about a single axis parallel to said x-y plane to deflect light from at least one intermediate spot to at least one other intermediate spot.

22. The optical switch of claim 21, further comprising a focusing element between said input fiber and said mirror array.

23. The optical switch of claim 22, said focusing element selected from the group consisting of a collimating lens, a converging lens, a diffractive focusing means, a refractive focusing means, and a gradient index self focusing lens.

24. The optical switch of claim 21, said mirror array comprised of an array of mirrors, each of said at least one mirror comprising a group of mirrors operating in concert to direct said light from said input fibers to said output fibers.

25. The optical switch of claim 21, further comprising a holding block holding said at least one input fiber at a non-perpendicular angle to said x-y plane.

26. The optical switch of claim 25, said retro-reflective surface comprised of the bottom surface of said holding block.

27. The optical switch of claim 25, said mirror array comprised of an array of mirrors, each of said at least one mirror comprising a group of mirrors operating in concert to direct said light from said input fibers to said output fibers.

28. The optical switch of claim 25, further comprising a focusing element between said input fiber and said mirror array.

29. The optical switch of claim 28, said focusing element selected from the group consisting of a collimating lens, a converging lens, a diverging lens, a diffractive focusing means, a refractive focusing means, and a gradient index self focusing lens.

30. The optical switch of claim 21, further comprising a holding block holding said at least one output fiber at a non-perpendicular angle to said x-y plane.

31. The optical switch of claim 30, said retro-reflective surface comprised of the bottom surface of said holding block.

32. The optical switch of claim 30, said mirror array comprised of an array of mirrors, each of said at least one mirror comprising a group of mirrors operating in concert to direct said light from said input fibers to said output fibers.

33. The optical switch of claim 30, further comprising a focusing element between said input fiber and said mirror array.

34. The optical switch of claim 33, said focusing element selected from the group consisting of a collimating lens, a converging lens, a diverging lens, a diffractive focusing means, a refractive focusing means, and a gradient index self focusing lens.

35. The optical switch of claim 21, at least one of said mirrors in said mirror array having an axis perpendicular to at least one other of said mirrors in said mirror array.

36. The optical switch of claim 35, said mirror array further comprising a holding block holding said at least one of said input and output fibers.

37. The optical switch of claim 36, said retro-reflective surface comprised of the bottom surface of said holding block.

38. The optical switch of claim 35, said mirror array comprised of an array of mirrors, each of said at least one mirror comprising a group of mirrors operating in concert to direct said light from said input fibers to said output fibers.

39. The optical switch of claim 35, further comprising a focusing element between said input fiber and said mirror array.

40. The optical switch of claim 39, said focusing element selected from the group consisting of a collimating lens, a converging lens, a diverging lens, a diffractive focusing means, a refractive focusing means, and a gradient index self focusing lens.

* * * * *